(12) United States Patent
Blasco Claret et al.

(10) Patent No.: US 11,099,304 B2
(45) Date of Patent: Aug. 24, 2021

(54) MICROLENS ARRAY

(71) Applicant: PHOTONIC SENSORS & ALGORITHMS, S.L., Valencia (ES)

(72) Inventors: Jorge Vicente Blasco Claret, Valencia (ES); Carles Montoliu Alvaro, Valencia (ES); Arnau Calatayud Calatayud, Valencia (ES); Leticia Carrion, Valencia (ES); Adolfo Martinez Uso, Valencia (ES)

(73) Assignee: PHOTONIC SENSORS & ALGORITHMS, S.L., Valencia (ES)

( * ) Notice: Subject to any disclaimer, the term of this patent is extended or adjusted under 35 U.S.C. 154(b) by 142 days.

(21) Appl. No.: 16/466,439

(22) PCT Filed: Dec. 5, 2016

(86) PCT No.: PCT/EP2016/079787
§ 371 (c)(1),
(2) Date: Jun. 4, 2019

(87) PCT Pub. No.: WO2018/103819
PCT Pub. Date: Jun. 14, 2018

(65) Prior Publication Data
US 2020/0064522 A1 Feb. 27, 2020

(51) Int. Cl.
*G02B 3/08* (2006.01)
*G02B 27/10* (2006.01)
*G02B 3/00* (2006.01)

(52) U.S. Cl.
CPC ................. *G02B 3/0043* (2013.01)

(58) Field of Classification Search
CPC .................................................. G02B 3/0043
(Continued)

(56) References Cited

U.S. PATENT DOCUMENTS

| 5,731,899 A | 3/1998 | Meyers |
| 7,605,857 B2 | 10/2009 | Kim |

(Continued)

FOREIGN PATENT DOCUMENTS

| DE | 102004003013 B3 | 6/2005 |
| EP | 2819172 A1 | 12/2014 |
| WO | 2006039486 A2 | 4/2006 |

OTHER PUBLICATIONS

International Search Report and Written Opinion for Corresponding International Application No. PCT/EP2016/079787 (12 Pages) (dated Aug. 10, 2017).

*Primary Examiner* — William Choi
(74) *Attorney, Agent, or Firm* — Lucas & Mercanti, LLP

(57) ABSTRACT

A microlens array that corrects the problems caused by aberrations and non-paraxiality of microlenses is provided. The microlens array has a plurality of microlenses tilted a tilting degree (α, β) depending on the position of the microlens in the microlens array. Simultaneously, or alternatively, the distances $P_{ul(i)}$ between optical centres ($P_i$, $P_{i-1}$) of adjacent microlenses depend on their positions in the microlens array. Both these distances $P_{ul(i)}$ and the tilting degrees (α, β) are dependent normally increasing upon the distance to the center of the microlens array. The size of the microlenses may also increase with the distance to the center of the microlens array. An opaque layer may also be applied covering the edges of adjacent microlenses.

14 Claims, 15 Drawing Sheets

(58) Field of Classification Search
USPC .................................................. 359/619, 741
See application file for complete search history.

(56) References Cited

U.S. PATENT DOCUMENTS

| | | |
|---|---|---|
| 2010/0265381 A1 | 10/2010 | Yamamoto et al. |
| 2011/0228142 A1 | 9/2011 | Brueckner et al. |
| 2012/0206620 A1 | 8/2012 | Findlay et al. |

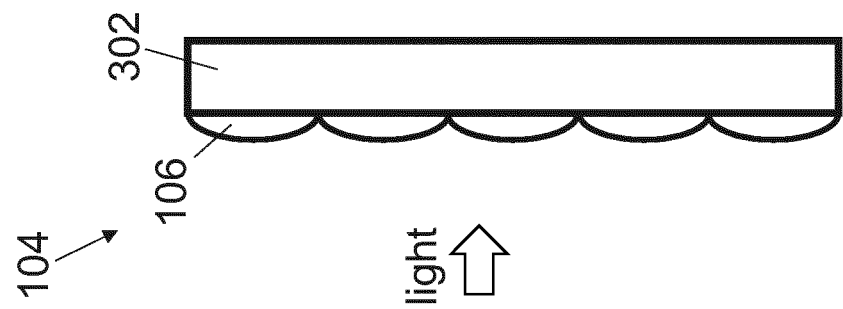
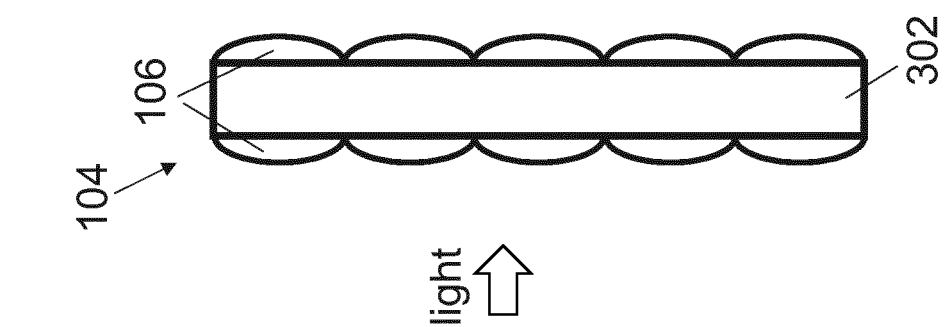
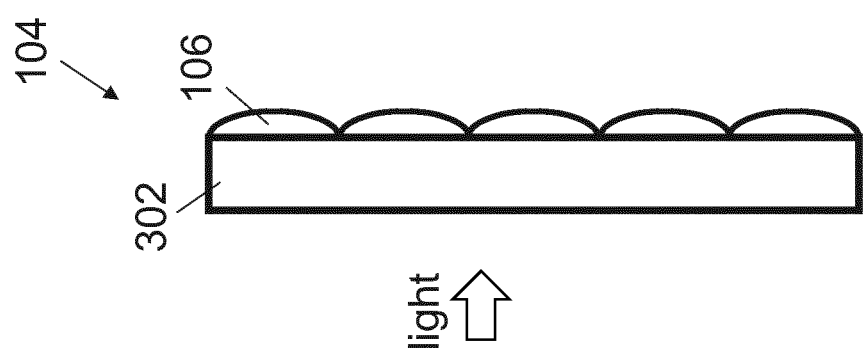

MICROLENS ARRAY

CROSS REFERENCE TO RELATED APPLICATION

This Application is a 371 of PCT/EP2016/079787 filed on Dec. 5, 2016, which is incorporated herein by reference.

TECHNICAL FIELD

The present invention is comprised in the field of microlens arrays, optical systems incorporating microlens arrays, light field images, and light field cameras.

BACKGROUND ART

Microlens arrays are common elements in micro-optical structures which use is extended in a wide number of applications, especially in the fields of imaging and illumination. Currently, a microlens array is considered, in most of the cases, a regular arrangement of microlenses in terms of optical parameters and disposition in the array. However, this arrangement is not optimum for many applications in which an individual design of each microlens in the array can improve the optical performance of the whole system. This introduces new degrees of freedom on the design of a microlens array.

In this regard, some investigations have been done in the field of artificial compound eye objectives. The design of chirped microlens arrays has been investigated. Particularly, the design of an array with different radii and different shapes for the microlenses (circular to ellipsoidal with more or less eccentricity) has been arranged to correct aberrations such as astigmatism or field curvature.

In the field of light-field devices, such as a plenoptic camera, the aberrations of the microlens array may degrade the performance of the optical system. The extreme microlenses in a microlens array frequently receive light with a high angle of incidence, which can be even greater than 30 degrees. These high angles of incidence cause very high aberrations in lenslets with only one or two surfaces and specially when, for manufacturability reasons, the usage of aspheres becomes unreliable for the very small dimensions typically adopted in the small mini-cameras of small dimensions battery-operated mobile devices.

Aberrations of the whole optical system may therefore spoil the performance of the device. Furthermore, a regular microlens array is not adapted to the optical performance of the main lens of a plenoptic camera, nor to the image sensor performance.

The present invention provides a new design for a microlens array that solves the problems mentioned above.

SUMMARY OF INVENTION

In the present invention, a new design for microlens arrays is provided. The invention drastically reduces the aberrations of the microlenses (critical part of plenoptic systems). The design of the microlens array can be adapted to the main lens and the image sensor to achieve improved performance of plenoptic cameras. The microlens arrays herein described, as well as the methods to build them, are not restricted to their use in plenoptic cameras, but they can be used in any optical system or device containing a microlens array.

Currently, a microlens array, as referred to in light field cameras, is a panel containing regularly spaced and regularly built microlenses. The present invention herein described provides several advantages for the microlens arrays, reducing aberrations and significantly improving the overall performance of the camera, optical system or device in which they are installed.

A first aspect of the present invention refers to a microlens array with variable tilt. The microlens array comprises a plurality of microlenses which are tilted a tilting degree depending on the position of the microlens in the microlens array. According to an embodiment, the tilting degree is dependent upon the distance between the microlens and the center of the microlens array.

In a 3D environment, the tilting degree has two components corresponding to the rotation of the plane of the microlenses perpendicular to the optical axis about two different axis of rotation. In an embodiment, at least a component of the tilting degree increases with the distance between the microlens and the center of the microlens array. This condition is fulfilled at least in a zone of the microlens array. The microlenses of the microlens array are preferably built on a substrate.

In accordance with a further aspect of the present invention there is provided a microlens array with variable pitch, in which the distances between optical centres of a plurality of adjacent microlenses of the microlens array depend on their positions in the microlens array. In an embodiment, the distance between the optical centres of adjacent microlenses is dependent upon the distance to the center of the microlens array, and preferably increases with the distance to the center of the microlens array.

The size of a plurality of microlenses of the microlens array may also be dependent upon the distance to the center of the microlens array, and preferably increases with the distance to the center of the microlens array.

The microlens array may further comprise at least one opaque layer covering the edges of adjacent microlenses. The opaque layer may be applied on the interstitial spaces between adjacent microlenses.

The different embodiments of the microlens array with variable tilt and the microlens array with variable pitch may be combined together. This way, the microlens array may comprise tilted microlenses and, at the same time, having variable distances between optical centres of adjacent microlenses.

Another aspect of the present invention refers to an optical system comprising any microlens array previously defined. The optical system may also comprise a main lens and an image sensor. The tilting degree is preferably dependent upon the field position. In an embodiment, at least a component of the tilting degree increases with the field position, this condition being fulfilled at least in a zone of the microlens array.

In the optical system, the microlenses are preferably designed with tilting degrees that reduce the chief ray angle of the microlenses. The microlenses are preferably designed with tilting degrees that compensate the non-linearities between the field position and the chief ray angle. According to an embodiment, the tilting degrees of the microlenses are such that the chief ray angle of the corresponding microlens is lower than a predetermined threshold, and preferably substantially 0 degrees.

In an embodiment of the optical system, the distance between the optical centres of adjacent microlenses is dependent upon the field position, and preferably increases with the field position. The microlenses are preferably designed with distances between the optical centres of adjacent microlenses that compensate the non-linearities between the field and the chief ray angle curve.

In an embodiment of the optical system, the size of a plurality of microlenses is dependent upon the field position, and preferably increases with the field position. The sizes of the microlenses may be such that the fill factor of the microlens array is substantially 1.

In accordance with another aspect of the present invention there is provided a device comprising any of the optical systems previously defined. The device may be a light field acquisition device, such as a plenoptic camera or a mini-camera for a mobile device. The device may be an electronic mobile device, which in turn may comprise a light field acquisition device. The electronic mobile device can be, for instance, a smartphone, a tablet, a laptop or a compact camera.

For the description of the present invention the following definitions and acronyms will be considered hereinafter:

- Microlens array: a plurality of lenslets (microlenses) arranged in an array.
- Regular microlens array: array formed by microlenses that have been designed to be regularly spaced and regularly built (homogeneous pitch through the whole structure of the array, same radius of curvature for all the lenses, same focal length, etc.), not taking into account the inhomogeneity due to fabrication imperfections.
- Lenslet or microlens: each small lens forming a microlens array.
- Tilted microlenses: A microlens array can have lenslets with surfaces having different tilts than other lenslets of the same microlens array (for example, lenslets with an increasing tilt towards the edge of the microlens array).
- Tilting of a microlens in a microlens array: The tilting represents the orientation change of the microlens (the rotation of its optical axis) in the microlens array. A zero tilting implies that the microlens is not tilted, and the microlens is orientated as in a regular microlens array according to the prior art, in which the optical axis of the microlens is perpendicular to the image sensor.
- Microlens pitch: distance between the optical centres of consecutive microlenses in a microlens array.
- Fill factor of the microlens array: ratio between the total area of the panel that contains the microlenses and the area covered by the optically useful part of the microlenses.
- CRA: Chief ray angle.
- Chief ray angle of microlens i ($CRA_i$): angle formed between the optical axis of the system and the ray that crosses the pupil of the system and reaches the centre of microlens.
- CRA vs field curve (or CRA curve): refers to the curve which draws the value of the CRA for a specific field position (usually drawn from field 0 up to field 1).
- Plenoptic camera: device that captures not only the spatial position but also the direction of arrival of the incident light rays.
- LF: Light field, four-dimensional structure LF (px, py, lx, ly) that contains information of the light captured by the pixels (px, py) below the microlenses (lx, ly) in a plenoptic camera.
- Plenoptic view: two-dimensional image formed by taking a subset of the light field structure by choosing a certain value (px, py), the same (px, py) for every one of the microlenses (lx, ly).
- Smart mini-cameras: miniature camera modules of small dimensions for mobile devices that can have additional features like the ability to adjust their frame rate automatically with illumination change, focus at different distances, zoom-in and out, etc., transforming the captured images according to predefined criteria.
- Microimage: image of the main aperture produced by a certain microlens over the image sensor.
- FOV: Field of view.

BRIEF DESCRIPTION OF DRAWINGS

A series of drawings which aid in better understanding the invention and which are expressly related with embodiments of said invention, presented as a non-limiting examples thereof, are very briefly described below.

FIGS. 3A-3C shows examples of different possible embodiments for a microlens array. FIG. 3A shows the substrate with microlenses facing the light coming from the left side and crossing the substrate before hitting the microlens, FIG. 3B shows microlenses at both sides of the substrate, and FIG. 3C depicts microlenses facing the light coming from the left and hitting the microlens before crossing the substrate.

DETAILED DESCRIPTION

Figure 1:
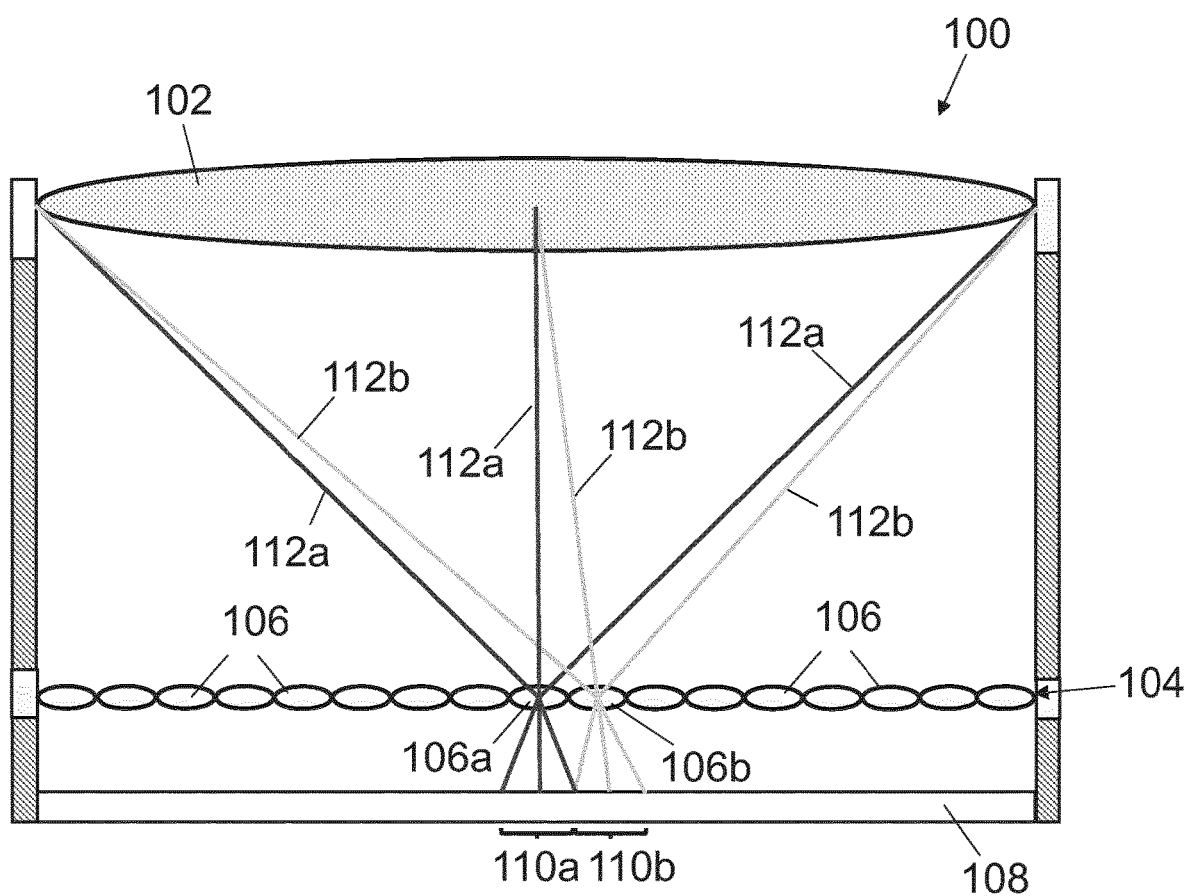
FIG. 1 illustrates a typical embodiment of a plenoptic camera.

Plenoptic cameras 100, as depicted in schematic representation of FIG. 1, are commonly composed by a main lens 102 (the upper barrel of optical components or a set of lenses equivalent to said main lens), a plurality of microlenses 106 arranged in a microlens array 104, and an image sensor 108. The system is a pupil imaging system, wherein each microlens 106 of the microlens array 104 forms an image of the main aperture of the plenoptic camera over a small area of the image sensor 108.

Figure 2:
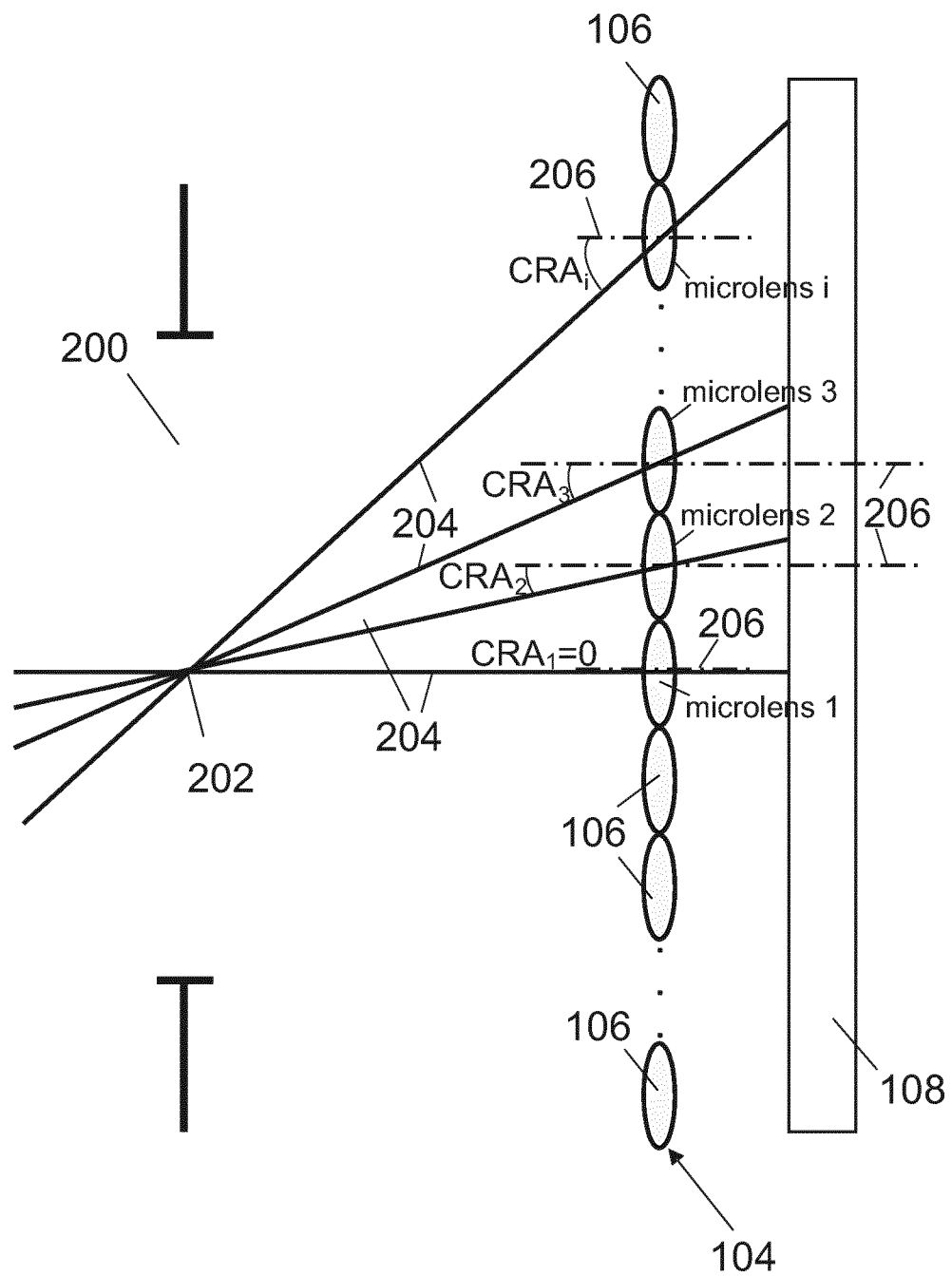
FIG. 2 illustrates the relation between the centre of a microimage and the corresponding CRA for a paraxial system (where the CRA curve is linear).

FIG. 1 shows two bunches of rays (112a, 112b) crossing the main aperture 200 of the plenoptic camera 100, and reaching a central microlens 106a and an adjacent microlens 106b in the array 104, respectively. Each bunch (112a, 112b) produces a different microimage (110a, 110b) over the image sensor 108. The two microimages (110a, 110b) do not overlap if the optical system is adequately designed. The centre of each microimage (110a, 110b) is determined by the corresponding chief ray angle (CRA). The $CRA_i$ is the angle formed between the optical axis 206 of microlens i and the ray 204 that crosses the centre of the aperture 202 or pupil of the optical system and reaches the centre of microlens i. FIG. 2 illustrates this definition for the example of a linear CRA curve. For an expert in the field, it is straightforward that the CRA curve of the microlens array 104 is a discretization (with as many points as the number of microlenses 106) of the continuous CRA curve for the main lens of the system. The shape of the microlenses 106, in a 2D frontal view, can be circles (with fill factors below 100%), squares, hexagons or any other shape, offering different advantages and disadvantages for several design criteria. The present invention is described using square microlenses; however, this should not be interpreted in a limiting way since the extrapolation to hexagonal, circular or any other shape is straightforward for an expert in the field.

Aberrations of the whole optical system may spoil the performance of the device. In the present invention, a new design for the microlens array 104 is employed, in which the aberrations of the microlenses (critical part of plenoptic systems) are drastically reduced, aiming to achieve improved performance of plenoptic cameras. The microlens arrays herein described, as well as the methods to build them, are not restricted to their use in plenoptic cameras, but can be used in any device containing a microlens array.

A microlens array 104 is usually a panel containing equally spaced and homogeneous microlenses (with all the lenslets composing the microlens array 104 having exactly the same shape). The microlens array 104 may have different manufacturing options or embodiments that, for manufacturability reasons, may be different to the schematic (and perfect) microlens array 104 shown in FIG. 1. FIGS. 3A-3C shows different possible embodiments for microlens arrays 104 comprising a substrate 302 and a plurality of microlenses 106 (the practical implementation of the microlens arrays 104 and the microlenses 106 in real products or prototypes differs from the simplified representation in FIG. 1).

The microlenses 106 are usually built or disposed on a substrate 302 with a given width. The microlenses 106 shown in FIGS. 3A-3C are arranged over the substrate 302 and they may be facing the light coming from the left side (FIG. 3C) or they may be placed at the opposite side such that the light crosses the substrate 302 before hitting the microlenses 106, (as in FIG. 3A). It is also possible to build a microlens array 104 with microlens surfaces arranged at both sides of the substrate 302 (FIG. 3B), wherein an individual microlens 106 or lenslet is composed by the two surfaces at both sides of the substrate 302. The invention might be also implemented with microlenses 106 as shown in FIG. 1 or with any other shapes. The three structures described in FIGS. 3A-3C are not intended to be limiting, but only some exemplary embodiments. The microlenses 106 may be disposed in the microlens array 104 with a fill factor of 1 or less. Also, the shape of the microlenses 106 may be a unique semi-sphere or composed by four sphere caps in a square microlens, or six sphere caps in hexagonal microlenses, or the conjunction of various sphere caps. Microlenses 106 may also be aspheric lenses.

The present invention is valid for any of the structures detailed herein but also for any other structure containing microlenses.

The aberrations of the microlens array 104 may degrade the performance of a plenoptic camera. The extreme microlenses in a microlens array frequently receive light with a high angle of incidence, which can be even greater than 30 degrees. These high angles of incidence cause very high aberrations in lenslets with only one or two surfaces and specially when, for manufacturability reasons, the usage of aspheres becomes unreliable for the very small dimensions typically adopted in the small mini-cameras of battery operated portable devices with very small dimensions. For example, in mini-cameras for mobile telephony the main lenses have sizes of a few millimetres, apertures are below one millimetre, and the microlenses may reach dimensions as low as a few microns.

Figure 4:
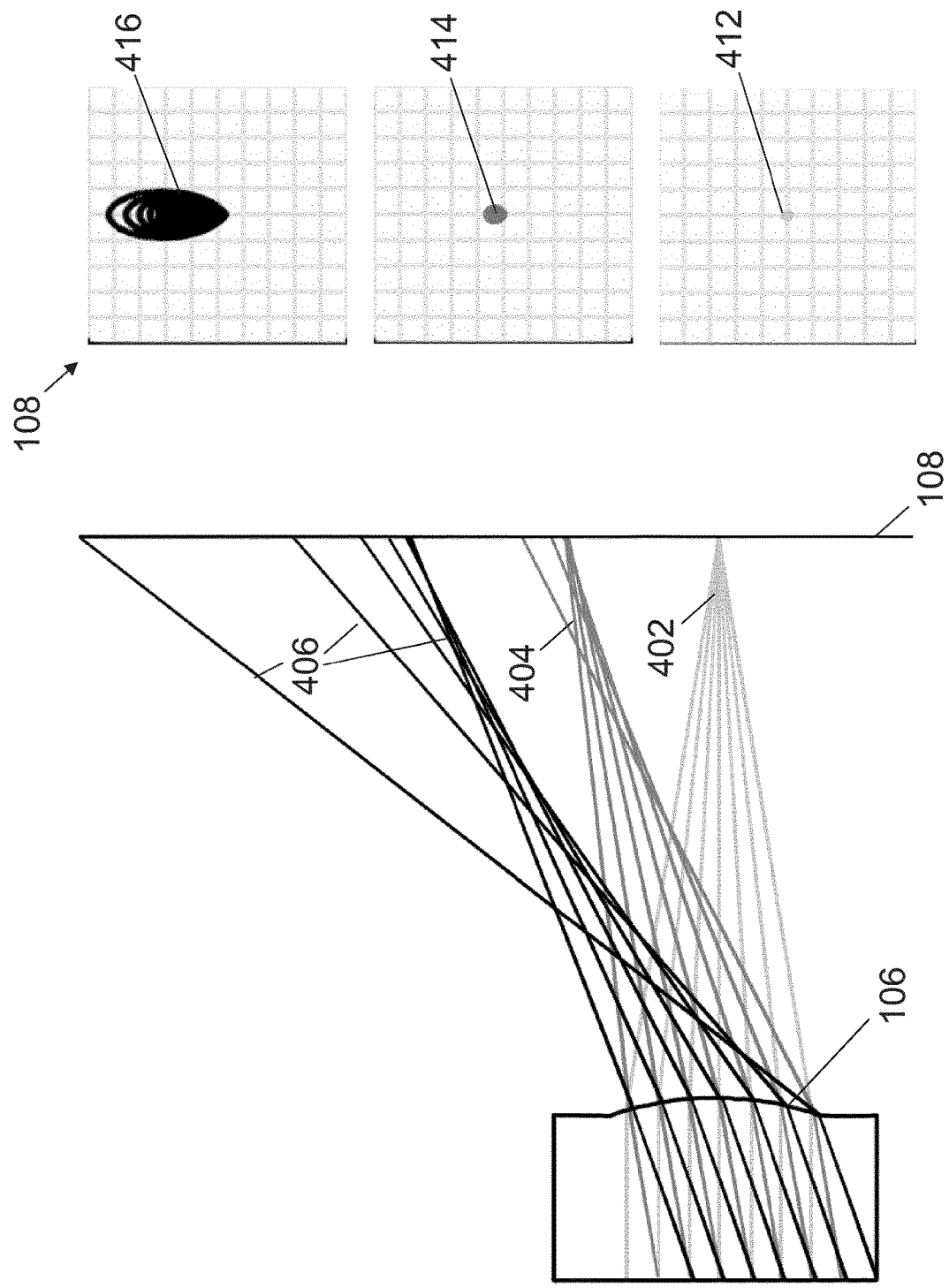
FIG. 4 represents the aberrations suffered by a microlens receiving light from the left with different incidence angles.

While the central microlenses 106a located near the optical axis of the main lens 102 (or within a certain distance) show a good optical behaviour (with low aberrations), the extreme microlenses with off-the-shelf implementations in small mini-cameras suffer problems due to the high-angles of incidence. FIG. 4 illustrates the aberrations suffered by a microlens 106 whose optical surface is built at the right side of a substrate 302 when increasing the field angle of collimated light that illuminates the microlens 106 from the left. On the left side of FIG. 4, a schematic view of the microlens 106 and the rays reaching the microlens 106 with an angle of 0 degrees (rays 402), 15 degrees (rays 404) and 30 degrees (rays 406) are depicted. The right side of FIG. 4 shows the spots (412, 414, 416) produced by the different rays (402, 404, 406) in the best focus plane. Rays 402 produce a spot 412, a sharp point, on the best focus plane for a microlens 106 near the optical axis. For rays 404 reaching the microlenses at an angle of 15 degrees, a spot 414 is produced, which is not as sharp as spot 412. Similarly, when the rays 406 hit the microlenses 106 at an angle of 30 degrees the aberration becomes very evident and the spot 416 produced on the sensor is much larger. The microlens 106 and its optical properties comply with typical design values for plenoptic cameras (refractive index, radius of curvature, dimensions, etc.). A very good behaviour of the microlens 106 for rays with an angle of incidence of 0 degrees can be observed (completely free of aberrations). However, incoming beams at 15 degrees generate quite badly aberrations, and the performance of the microlens is completely spoiled when the beam has an angle of incidence of 30 degrees.

In accordance with a first aspect of the present invention, there is provided a design with tilted microlenses to solve the problem described above (i.e. the situation in which the extreme microlenses of the array receive light with high-incidence angles). In an embodiment, the microlenses are adequately tilted or orientated depending on their location within the array to reduce drastically the angle of incidence of the rays and, therefore, in this way minimizing the aberrations of the microlens array and greatly improving the performance of the camera.

Figure 7:
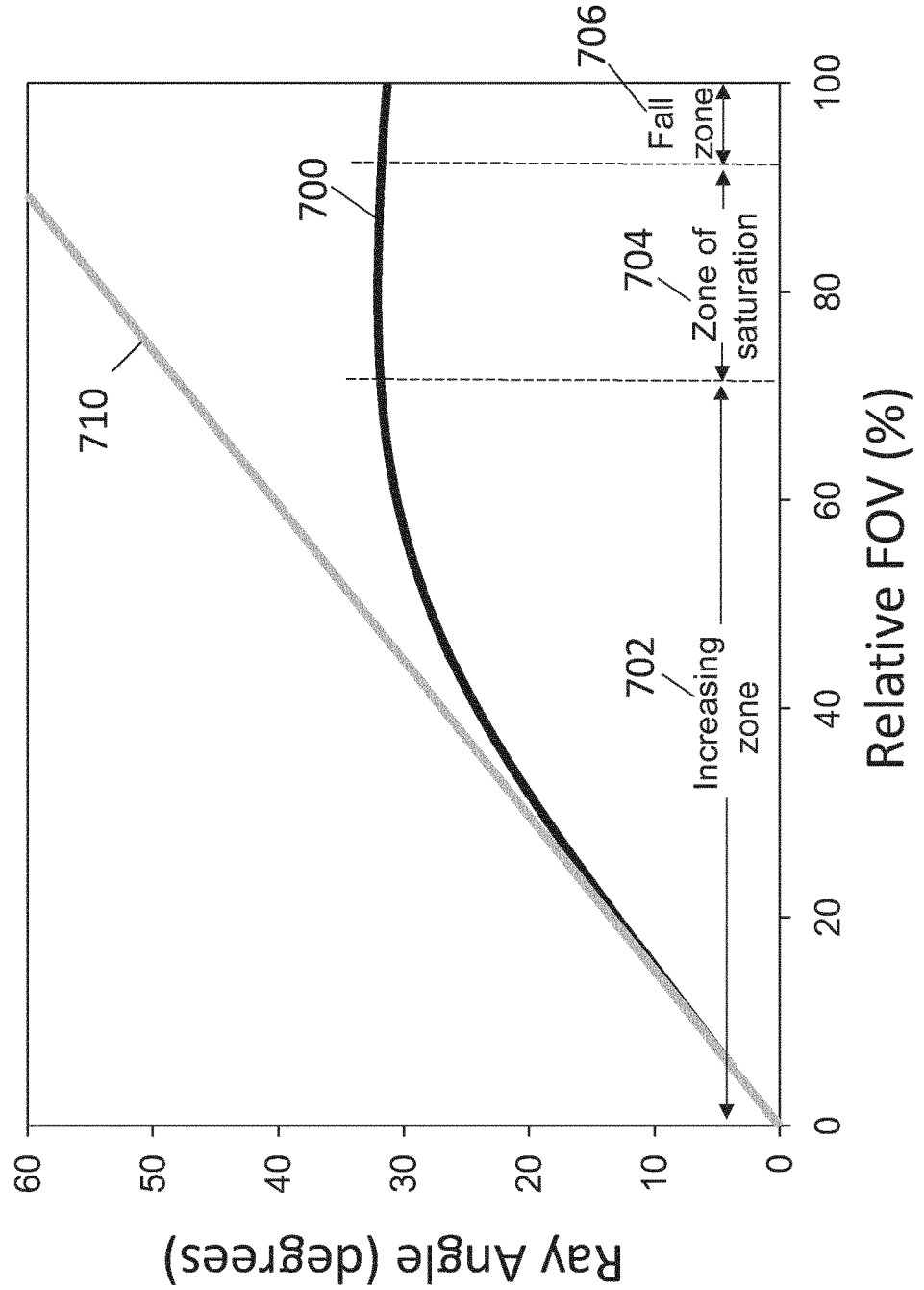
FIG. 7 depicts a typical plot of the CRA of arrival of light to the image plane (or the microlenses plane in plenoptic sampling) of a mini-camera vs the field, and a comparison with a linear CRA curve representing a paraxial behaviour.

In an embodiment, the microlenses can be tilted to reach substantially down to 0 degrees for the CRA of every microlens 106 of the array; hence, for the rays that cross the centre of the aperture 202 of the main lens 102 and reach a microlens 106, it is irrelevant whether the microlens is near the optical axis or at high fields near the limit of the field of view (FOV). This phenomenon becomes especially critical in the very small dimensions of mini-cameras for mobile devices where the total track length (TTL) of the camera becomes only a few millimetres and the angles become quite high (values around 30 degrees are quite common, as shown in the example of FIG. 7). In this embodiment, all the microlenses 106 would show the same behaviour as that of the central microlenses 106a, being free of most aberration effects. To achieve this behaviour, each microlens has to be gradually more and more tilted as the field increases. However, at some point at very high fields, the tilt saturates and then starts to minimally decrease (as microlenses are tilted to compensate the effect shown in FIG. 7). Central microlenses 106a do not need to be tilted, and they are more and more tilted as we approach the extreme zones of the panel that contains the microlenses, until the saturation of CRA (zone of saturation 704 in FIG. 7) is reached and the CRA starts to decrease (fall zone 706 in FIG. 7), being the microlenses with higher $CRA_i$ the most tilted microlenses.

In at least one embodiment, the microlenses 106 can be tilted until a specific acceptable CRA is reached for every microlens 106 of the microlens array 104. In at least one embodiment, the microlenses 106 can be tilted following any CRA curve specifications (imposed by the main lens 102) to ensure a good performance of the whole plenoptic system.

Figure 5A:
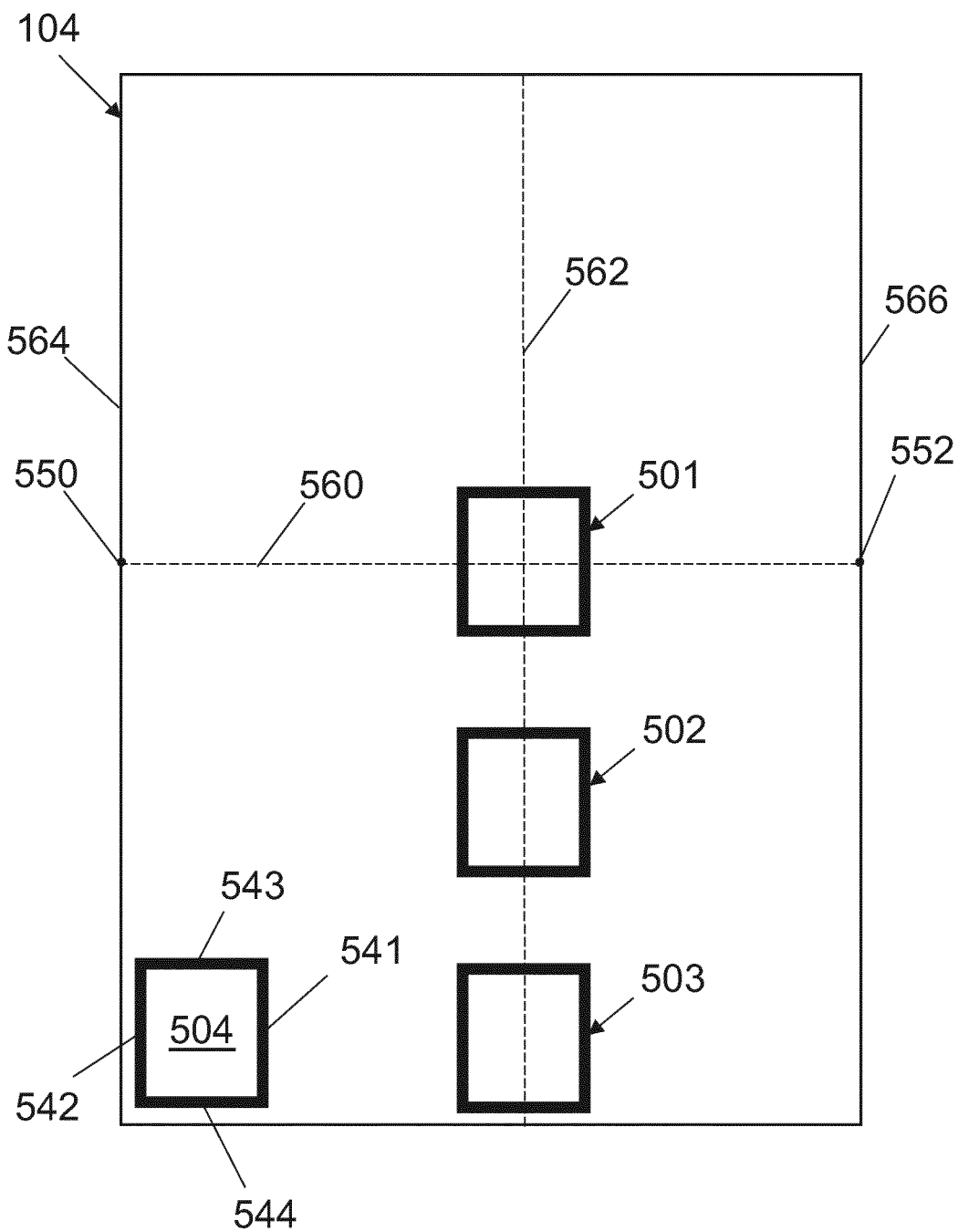
FIGS. 5A-5E show an example of the proposed design for the microlens array with tilted microlenses.
Figure 5B:
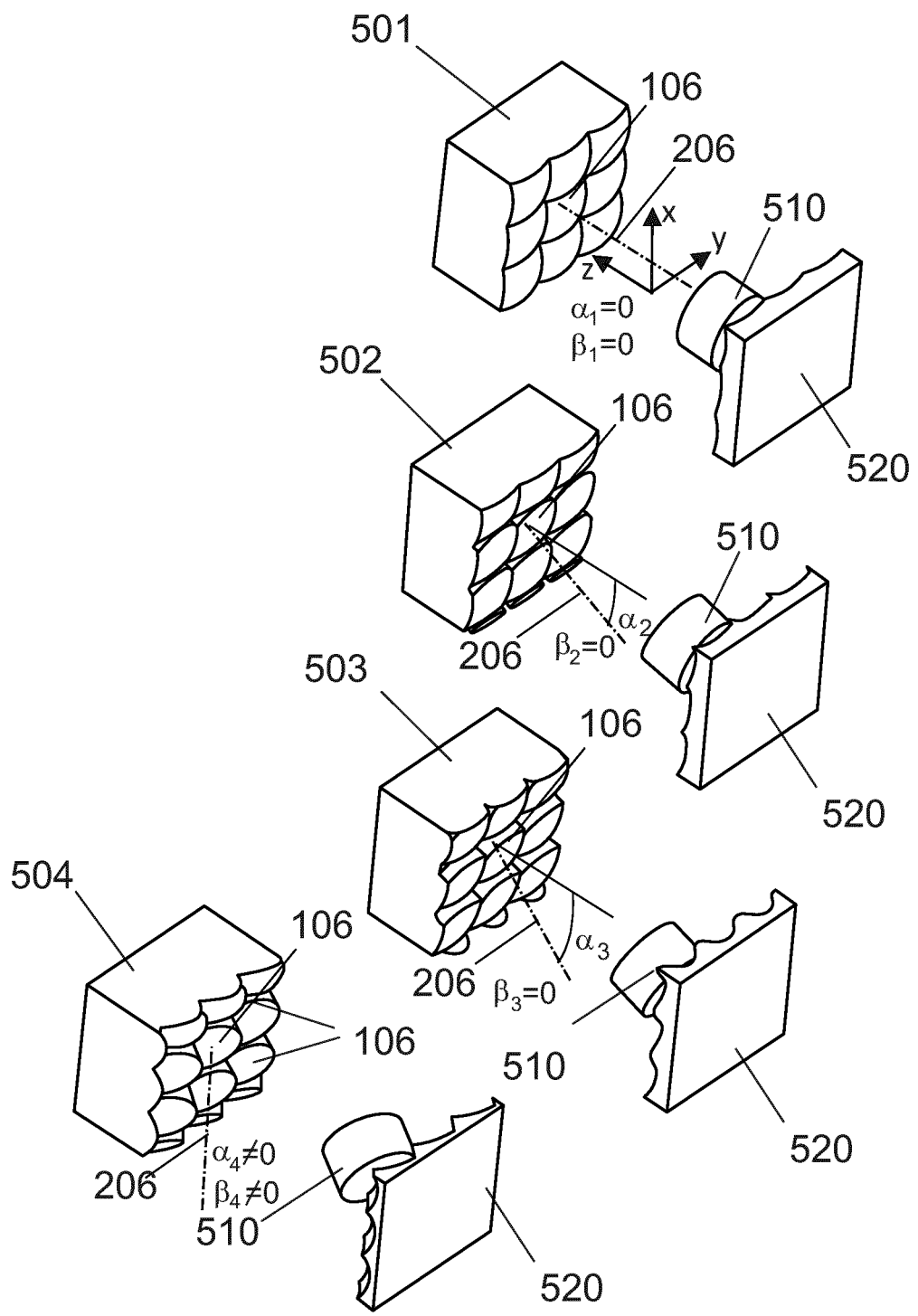
Figure 5C:
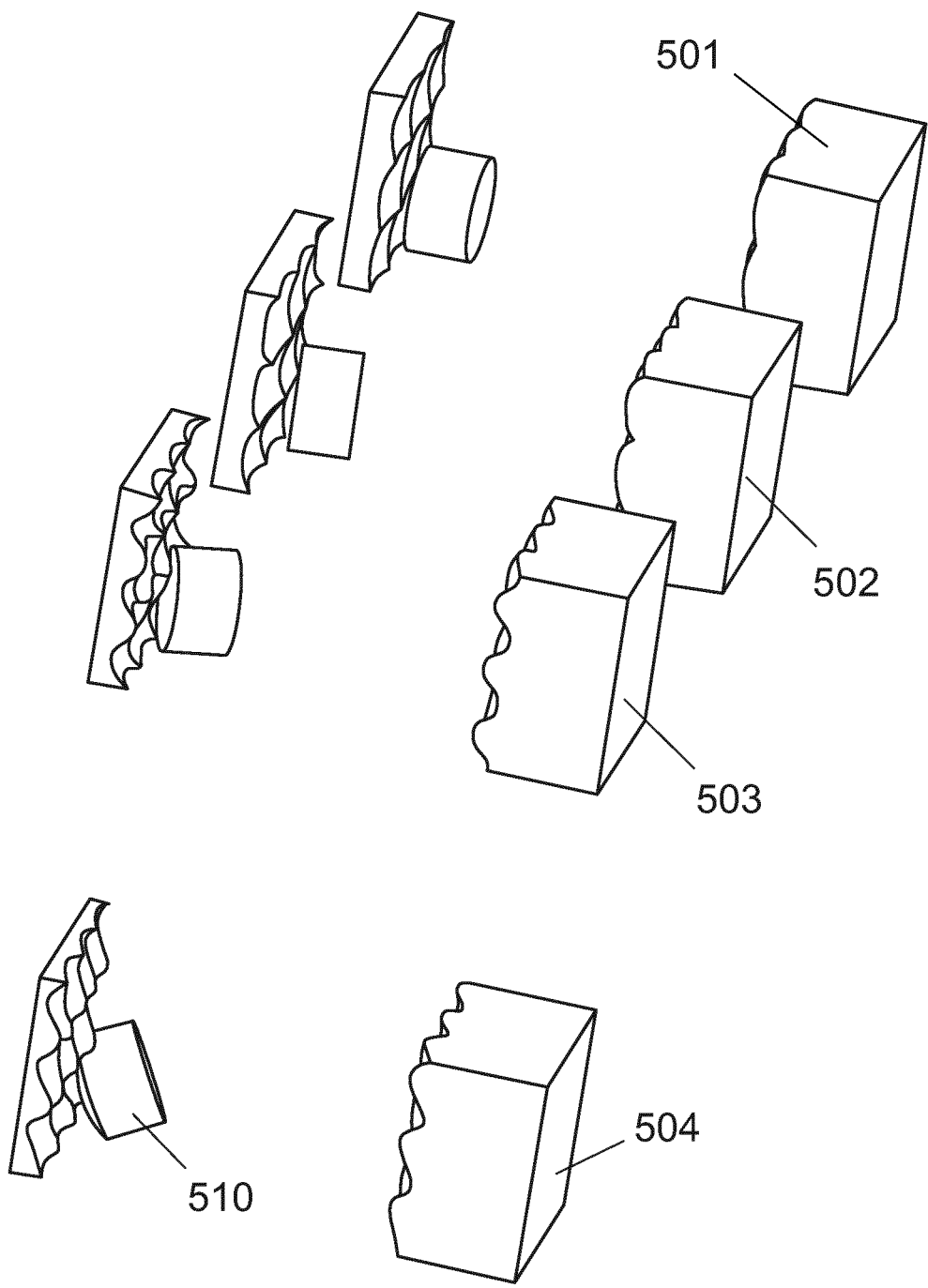
Figure 5D:
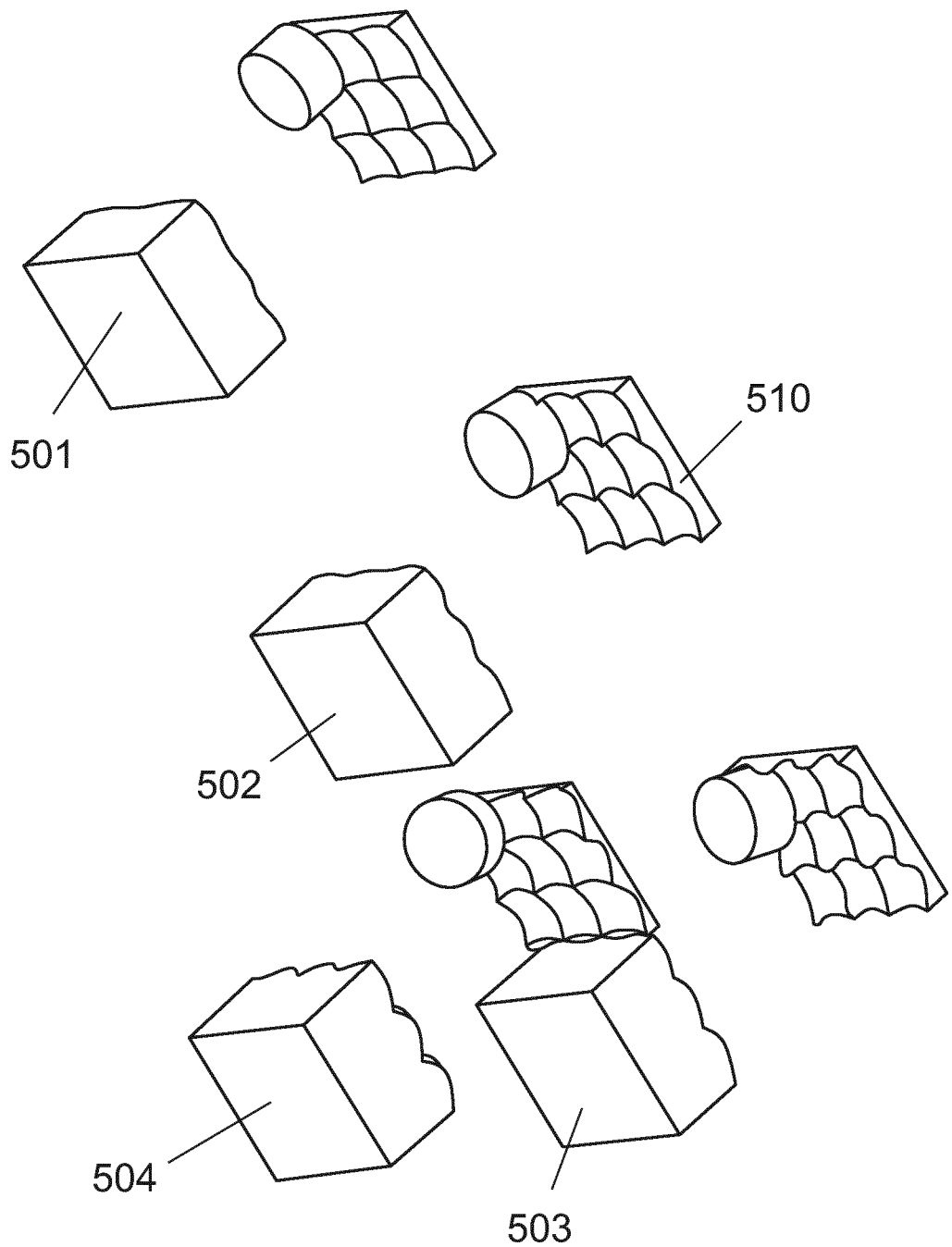

FIGS. 5A-5E show, according to the present invention, an example of a design for the microlens array 104 with tilted microlenses 106, that helps to understand how to design and manufacture microlenses in compliance with the invention. These figures explain a particular embodiment that in no case should be interpreted as a limiting implementation but only a particular embodiment of tilted microlenses. In this particular example, microlenses 106 built on a substrate 302 are used. FIG. 5A shows a 2D view of the microlens array 104 panel with four different highlighted zones (a central zone 501, a middle lower zone 502, an extreme lower zone 503 and a corner zone 504), each zone comprising one or more microlenses 106 designed with a specific tilt. FIGS. 5B, 5C and 5D show three 3D views of the designed tilted microlenses 106 built for the four zones (501, 502, 503, 504) specified in FIG. 5A, each highlighted zone comprising a matrix (one or more rows, and one or more columns) of tilted microlenses 106. The optical axes 206 of the microlenses in a regular (i.e. not tilted) microlens array are parallel to axis z in FIG. 5B. However, optical axis 206 of microlenses in the microlens array of the present invention rotate a certain angle α vs axis x and z as we move vertically along line 562 (as depicted in the example of FIG. 5B) and a certain angle β vs axis y and z as we move horizontally depending, on their location within the array; in other positions not directly over lines 560 and 562, such as corner zone 504, both angles α and β are not equal to zero. As shown in the examples of FIG. 5B, optical axis 206 has an angle β=0 for all those microlenses which are centred with respect to the central vertical line 562. Similarly, the optical axis 206 of microlenses centred with respect to the central horizontal line 560 have an angle α=0.

Figure 5E:
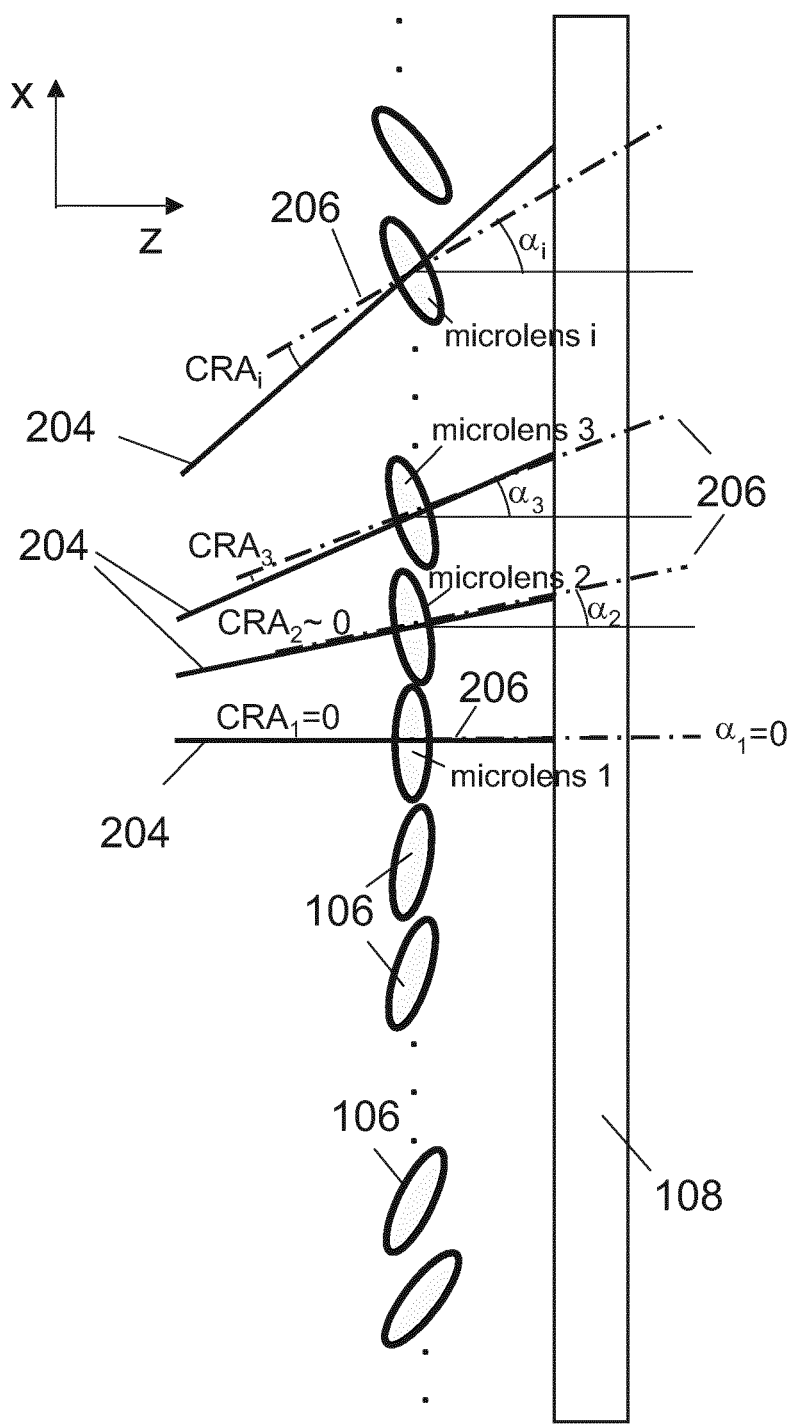

FIG. 5B also depicts an example of a stamping tool 510 (e.g. a cylinder with different tilts) used to produce manufacturing molds 520 which in turn can be employed to manufacture microlenses 106 with different tilts over different areas 501, 502, 503, 504 of the substrate. The mould 520 is used to build the tilted microlenses depending on the particular zone of the microlens array 104 panel. FIG. 5E shows a schematic 2D view of the example embodiment of FIGS. 5A-D. In FIG. 5E, the microlenses 106 are tilted with different tilting degrees ($α_i$, $α_2$, $α_3$, ..., $α_i$) around their optical axis 206 depending on their location in the array. It is straightforward that a tilted microlens can be understood as a lens in which the vertex and the optical centre are not located at the same position with respect to the plane 108; thus, tilting the microlenses is equivalent to shifting the vertex of the microlens along axis x and y until a specific $CRA_i$ is reached for the microlens i.

In a real 3D environment, a tilting degree with two components (α, β), corresponding to the rotation of the plane of the microlenses perpendicular to the optical axis 206 about two different axis of rotation (y, x in FIG. 5B), can be considered. It can be observed that in the central zone 501 of the microlens array 104 panel the microlenses are not tilted at all, such that the component a of the tilting degree (α, β) is equal to zero ($α_1$=0) in the 2D representation of FIG. 5E. As the field increases, the component a of the tilting degree (α, β) also increases (tilting degree $α_2$ for microlenses in the middle lower zone 502 is smaller than tilting degree $α_3$ for microlenses in the extreme lower zone 503, as shown in FIGS. 5B and 5E). The maximum tilt of α and β is built for the corners of the microlens array 104 panel, corresponding to the corner zone 504. Nevertheless, in an embodiment the maximum tilt is actually not built for the extreme microlenses of said corner zone 504, but for inner microlenses still approaching the corner zone 504 of the panel. This is due to the saturation and subsequent decreasing of the CRA at high fields in a normal mini-camera design (see zones 704 and 706 in FIG. 7): the tilt is built increasing towards the right of zone 702, it remains nearly constant in zone 704 and is slightly decreased in zone 706.

FIGS. 5B-5D also shows an example of a possible way to manufacture the mould to build the microlens array 104. In this example, a stamping tool 510 is used to build a mould 520, over which liquid optical polymers can be deposited, that are later solidified (with UV-light or any other procedure). Many other stamping, milling, grinding, etching or other tools may be used in order to build the moulds and the tilted microlenses. Also, other techniques as reactive ion etching and many other may be used, including optical manufacturing techniques similar to the techniques used for silicon manufacturing. The particular description of the figures should not be interpreted as a limiting factor.

As it is evident from FIGS. 5A-5D, to minimize aberrations the degree of tilt of the microlenses 106 increases with the field until reaching the zone of saturation 704.

Photo-sensors are extremely efficient when they receive light reaching the sensor perpendicular to the photosensitive surface, but their quantum-efficiency (related to the amount of current or electrical-energy generated by a given amount of incident light-energy) deteriorates when the light beams reach the photosensitive surface at an angle. For smartphone cameras, and in general for mini-cameras of small dimensions, the angle of incidence of the light beams over the image sensor 108 must be limited by the lens design (to avoid the quantum efficiency losses just mentioned and crosstalk between neighbouring pixels). The optical design of the upper lens and the sensor design are conceived to match each other: the aspheric surfaces used in the main lens design cause that the angle of arrival of light beams to the image-sensor for different field values is very nonlinear (as shown in the curve 700 in FIG. 7), and the sensor design is equally optimized to have the maximum quantum efficiency for precisely those same angles of arrival. To reach this matching design between the optics and the sensor, the sensors are designed in a way that every pixel (every individual photosensitive surface) has a pixel-microlens that concentrates the light beam on the central photosensitive area of every pixel. Having in mind that, due to their aspheric surfaces, small mini-cameras have a CRA-curve of the main lens (or of the upper barrel equivalent lens) similar to 700 in FIG. 7, the design of the sensor places the pixel-microlenses with a different pitch (smaller) than the pixel pitch, optimizing the sensor for the expected angles of incidence of light coming from optics with very small mechanical total track lengths (MTTL) and hence large angles of arrival for large fields.

In a pupil imaging system the image sensor 108 gathers a collection of microimages, each microimage formed by every one of the microlenses 106. The location of these microimages over the image sensor 108 depends on the CRA curve (curves 700 or 710 in FIG. 7); more specifically, the centre of each microimage will be determined by the corresponding $CRA_i$, the CRA of each microlens i of the microlens array 104.

Figure 6:
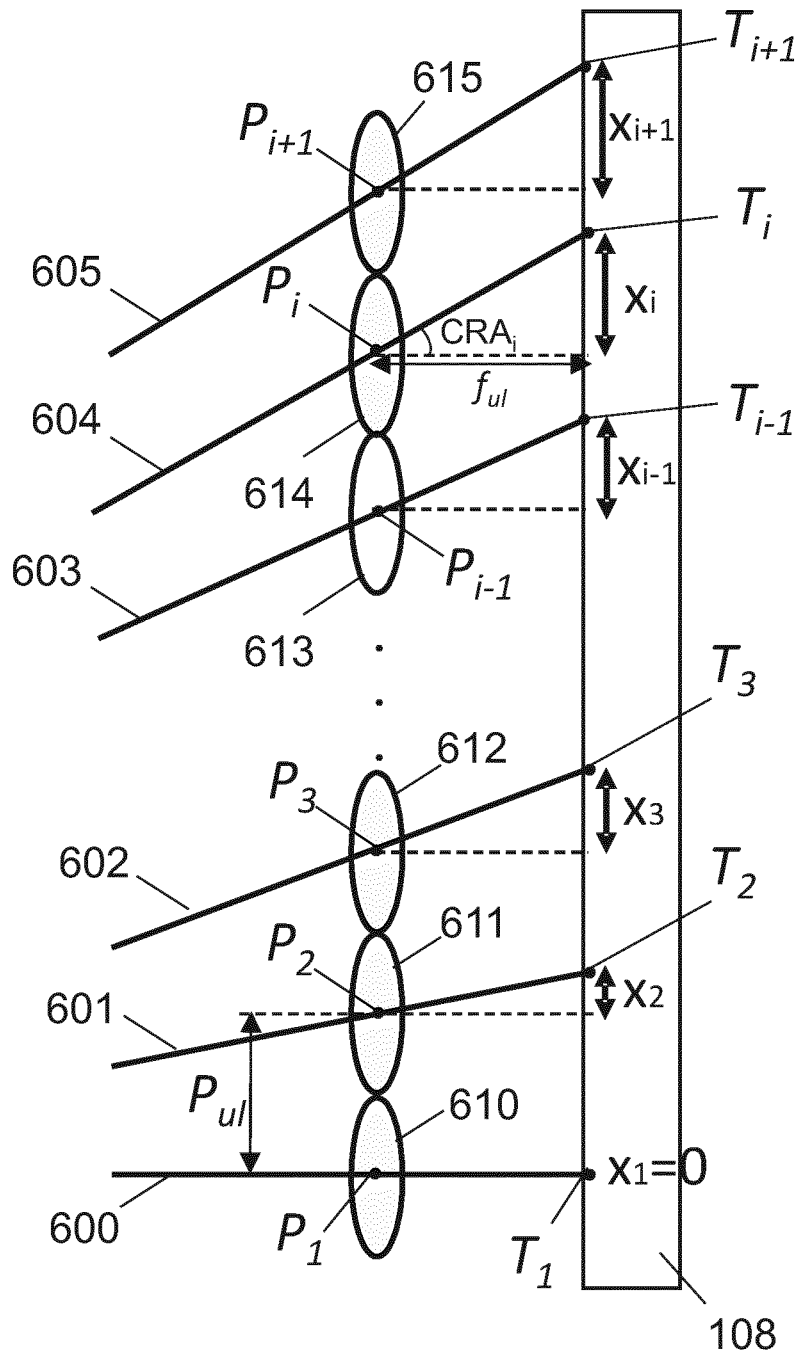
FIG. 6 illustrates the relation between the centre of the microimage and the corresponding CRA for an arbitrary CRA curve, according to an example of the prior art.

FIG. 6 shows this dependence. CRA are depicted for a first 610 microlens, a second 611 microlens, a third 612 microlens, an (i−1)-th microlens 613, an i-th microlens 614, and an (i+1)-th microlens 615. For the first microlens 610, the ray 600 that crosses the pupil of the optical system and reaches the centre $P_1$ of this microlens 610 determines that the centre $P_1$ of the first microlens 610 and the centre $T_1$ of the respective microimage are both located at the optical axis ($x_1=0$; $CRA_1=0$). As the field increases, there is an increasing displacement ($x_{i+1} > x_i > x_{i-1} > x_3 > x_2 > x_1 = 0$) between the centres ($P_1, P_2, P_3, \ldots, P_{i-1}, P_i, P_{i+1}$) of the microlenses and the centres ($T_1, T_2, T_3, \ldots, T_{i-1}, T_i, T_{i+1}$) of their respective microimages, since the slope of the respective rays (600, 601, 602, 603, 604, 605) increases with the field (this particular behaviour is due to the CRA curve (700) used as an example, but the reasoning is valid for any other CRA curve behaviour). Assuming periodic microlenses, the centre of the microimage i produced by the microlens i (614) can be written as:

$$T_i = P_i + x_i = P_i + f_{ul} \tan(CRA_i) \quad (\text{Eq.1})$$

where $T_i$ refers to the location of the centre of microimage i $P_i$ refers to the location of the centre of microlens i (614) and $f_{ul}$ refers to the focal length of the microlenses (assuming all microlenses have the same focal length). It is evident that the equation above is valid for any CRA curve.

For a linear CRA curve (which is the paraxial case where the CRA curve is not a curve but is linear, as shown in line 710 in FIG. 7), and using regular microlenses (with the same pitch $P_{ul}$ for all the microlenses, and thus $P_i = P_{ul} \cdot i$), the equation above can be written as:

$$T_i = P_{ul} i + f_{ul} ki = (P_{ul} + f_{ul} k)i \quad (\text{Eq. 2})$$

where $P_{ul}$ is the pitch of the microlenses, k is a constant depending on the geometric parameters of the camera that determines the relation between microlens and microimage (that is, it determines how much larger is the microimage than the microlens), and i is an integer number corresponding to the i-th microlens 614. It can be seen from equation 2 that all microimages have the same pitch $P_{ul} + f_{ul} k$ or, in other words, they are equally spaced. It is evident that to reach these equally spaced microimages having equal microlenses, the only way is having a linear CRA curve, which is the case of the paraxial approximation.

FIG. 7 shows an example of a typical CRA curve 700 for a specific optical design for illustrative purposes and should not be taken as a limitation. For this example, up to field H=0.3, the CRA is approximately linear, but beyond H=0.3, the CRA differs more and more from the paraxial behaviour (represented by linear CRA curve 710) as the field increases. In the example of FIG. 7 the CRA curve 700 is divided into three different regions or zones: a first and larger region, increasing zone 702, in which the CRA increases with the field until reaching a second region for high fields (in the example, around 70%-90% relative FOV), zone of saturation 704, in which the CRA remains substantially constant with the field; and a third and small region in the extreme fields (in the example, more than 90% relative FOV), fall zone 706, in which the CRA decreases with the field. This directly implies that microimages in the image sensor 108 will not be equally spaced (at least beyond H=0.3) if the microlenses have been designed to be equally spaced, the centres of the microimages will be closer to each other as they approach the corners of the field (or equivalently the corners of the image sensor 108) due to the CRA saturation of curve 700.

To compensate this non-paraxial CRA behaviour, aiming to still have equally spaced microimages all over the sensor, in accordance with a further aspect of the present invention there is provided a new design of the microlens array 104 such that the centres of the microlenses 106 are not equally spaced; instead, their separation change as the field increases. From equation 1, and taking into account the aim to have periodic microimages with pitch equal to $T_u$, so that $T_i = i T_u$, the centre of the microlens i can be written as:

$$P_i = i T_u - f_{ul} \tan(CRA_i) \quad (\text{Eq. 3})$$

Figure 8:
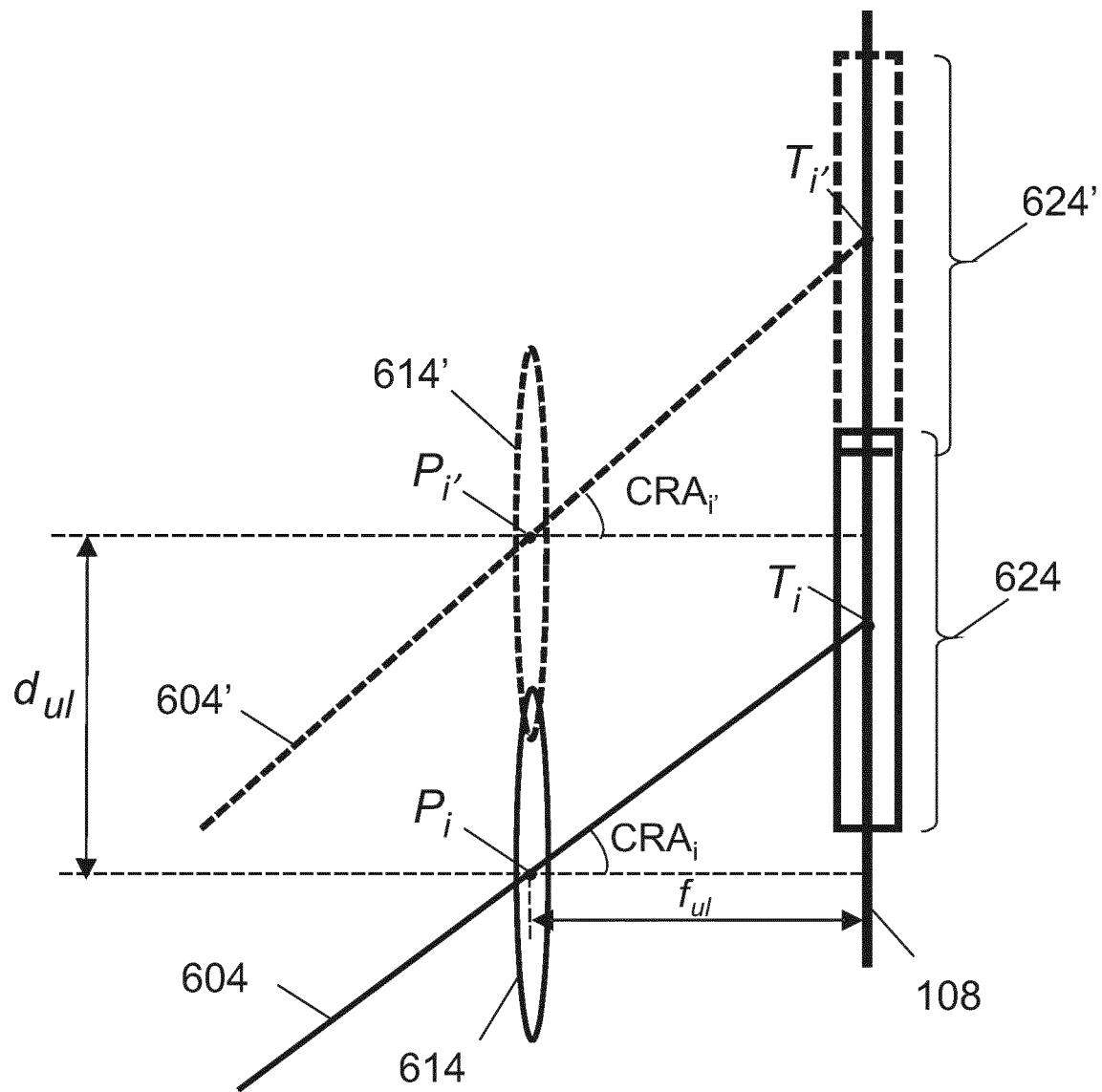
FIG. 8 shows the location of a microimage obtained with an equally spaced microlens array and a typical CRA curve and how it differs from the microimage that would have been obtained in a system with microlenses equally spaced but with a linear CRA curve (instead of a typical CRA curve).

To illustrate this phenomenon, in FIG. 8 two microlenses (614, 614') and the two corresponding microimages (624, 624') over the image sensor 108 are shown. The microlens 614 corresponds to the microlens i (as in FIG. 6) in an array containing equally spaced microlenses. Therefore, from Eq. 1 the centre $T_i$ of the corresponding microimage 624 is located at:

$$T_i = P_{ul} i + f_{ul} \tan(CRA_i) \quad (\text{Eq. 4})$$

where $CRA_i$ is the angle formed between the optical axis and the ray 604 that crosses the centre of the pupil of the system and reaches the centre $P_i$ of microlens i (614). As already explained, in this case and due to the saturated CRA curve, the microimage 624 will be centred in a position which is different from the position (given by equation 2) that it would had been centred (microimage 624') should the system had shown a linear CRA curve 710.

In order to compensate this effect, and turn the microimage 624 to the location where it would have been for paraxial lenses (position of microimage 624' in FIG. 8), the centre $P_i$ of the microlens i (614) needs to be displaced a certain distance $d_{ul(i)}$ (and thus, change the pitch to $P_{ul(i)}$ for this particular microlens i) to the position corresponding to the centre $P_{i'}$ of microlens i' (614'); that is, $P_i$ moves to in FIG. 8 so that the centre $T_i$ of microimage 624 moves to the centre $T_{i'}$ of microimage 624' produced by ray 604'.

Figure 9:
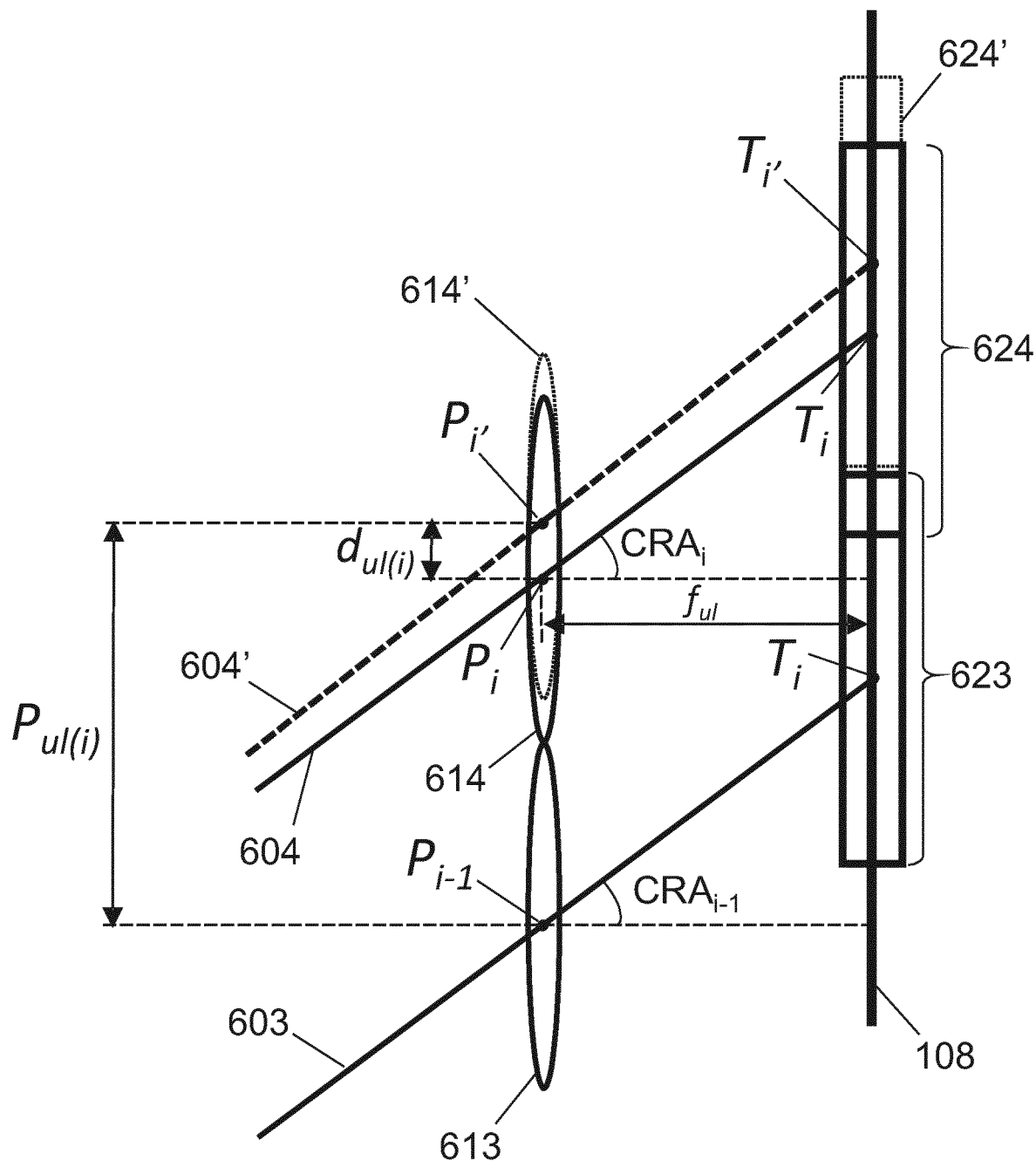
FIG. 9 represents a similar example of FIG. 8 considering the adjacent microlens.

FIG. 9 represents an example similar with that of FIG. 8 (although with a shorter displacement $d_{ul(i)}$) considering the adjacent microlens i−1 (613), in which the centre $P_i$ of microlens i (614) is displaced a distance $d_{ul(i)}$. The original and constant pitch $P_{ul}$ is increased to a new pitch $P_{ul(i)}$ for microlens i. Microimage 624 of microlens i moves to microimage 624', so that microimages of consecutive microlenses (613, 614') do not overlap.

Extending this rationale to all the microlenses and fields is straightforward, and results in a non-regular microlens array panel where the centres of microlenses are not anymore equally spaced (the distance from the centre of microlens i−1 to the centre of microlens i is smaller than the distance from the centre of microlens i to the centre of microlens i+1), adopting longer and longer pitches as the field increases, as shown for instance in the example of FIG.

10, where microlenses (1010, 1011, 1012, 1013, 1014, 1015) are separated an increasing distance ($P_{ul(i+1)} > P_{ul(i)} > P_{ul3} > P_{ul2}$) as the field increases, since the deviation of the slope of their respective rays (1000, 1001, 1002, 1003, 1004, 1005) vs the paraxial approximation also increases. For most of the definitions, figures and explanations herein described that involve geometric considerations, a 1D model considering height has been used (1D microlens panel, 1D image sensor) for illustrative purposes; but the extension to 2D considering height and width is straightforward.

Figure 10:
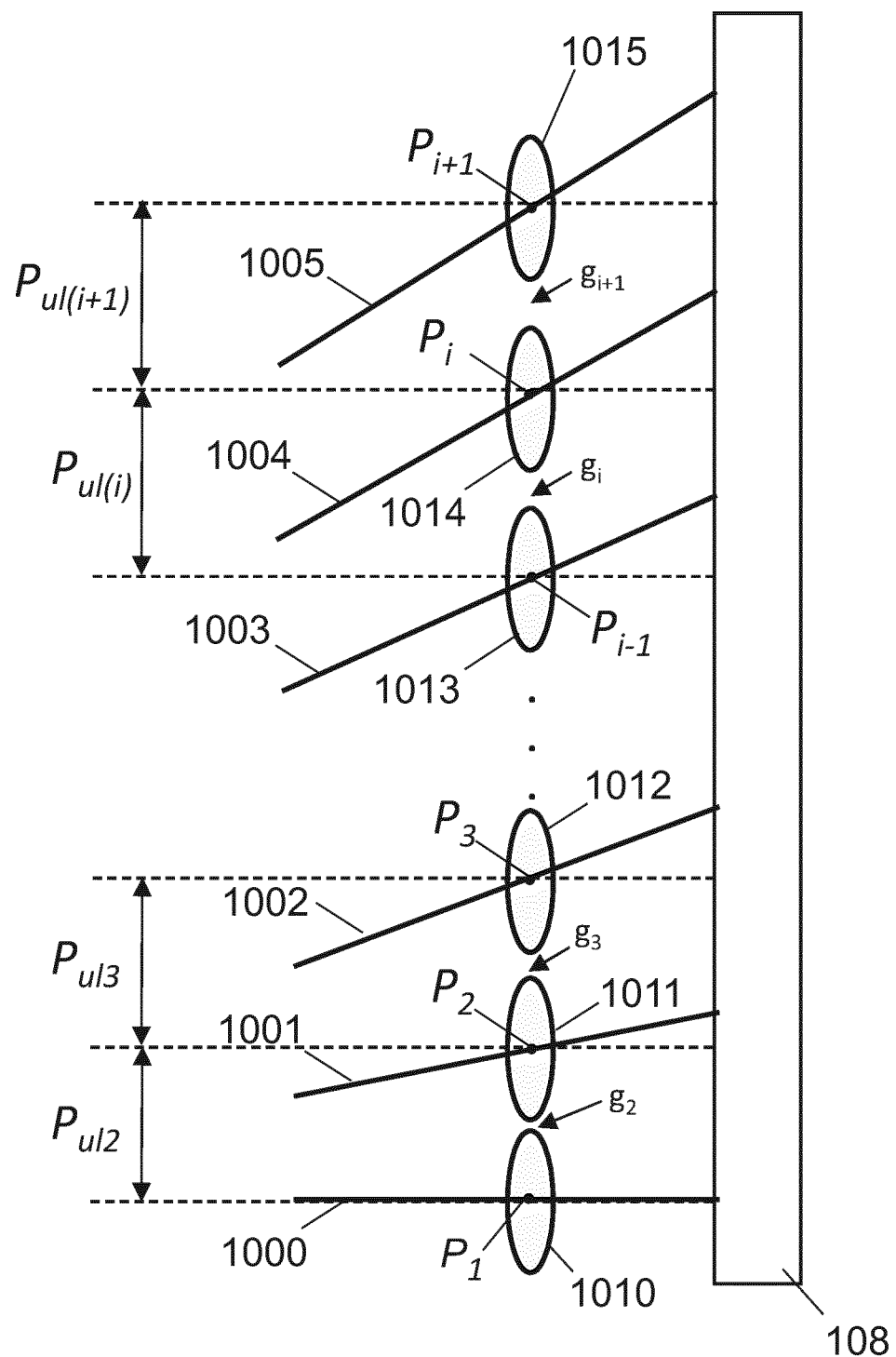
FIG. 10 depicts, according to an embodiment of the present invention, an example of a microlens array with variable pitch.
Figure 11:
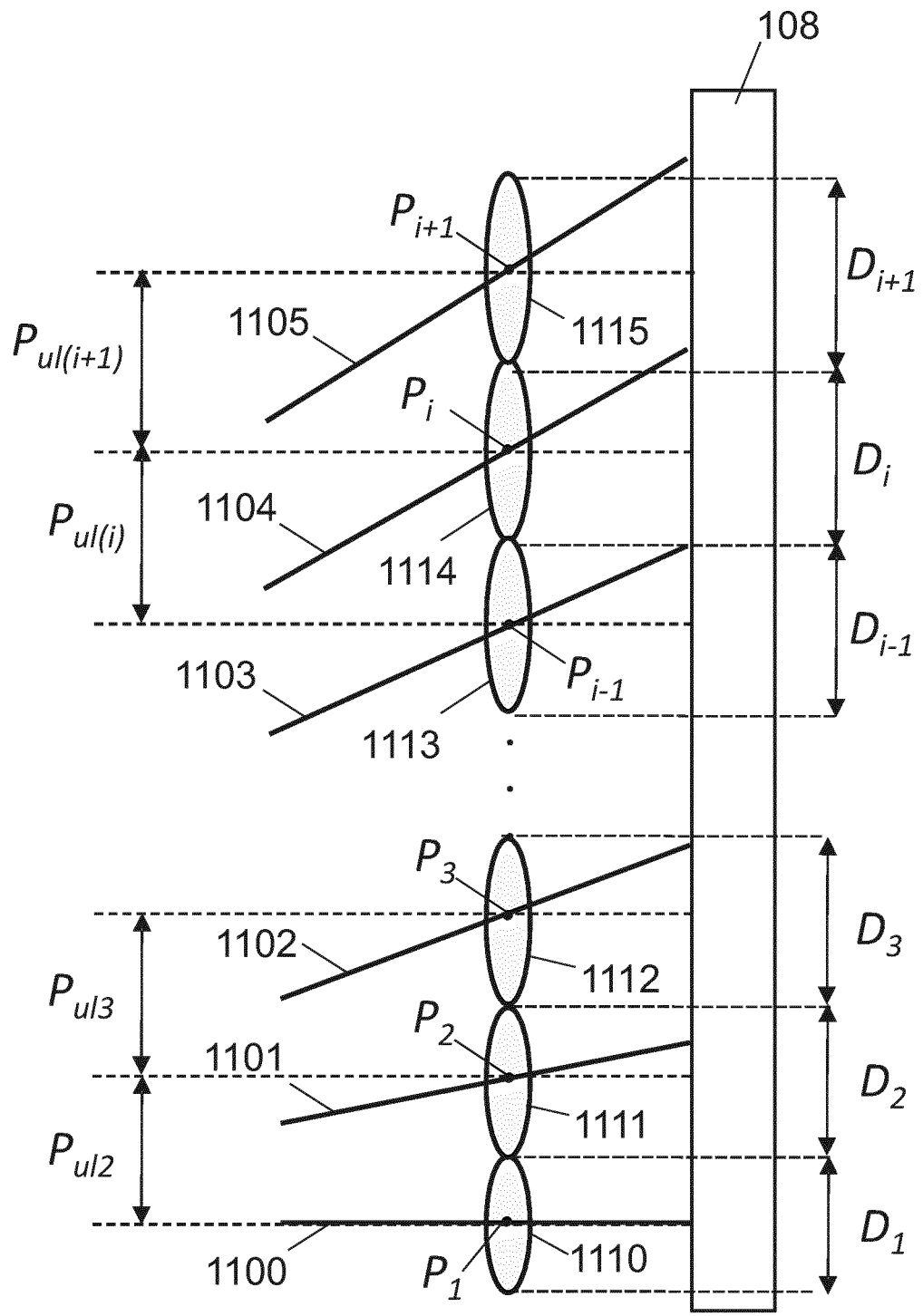
FIG. 11 depicts an embodiment of a microlens array with variable pitch, as in FIG. 10, and also with variable size to maintain the fill factor close to 1.

As shown in the example of FIG. 10, as the distances ($P_{ul2}$, $P_{ul3}$, $P_{ul(i)}$, $P_{ul(i+1)}$) between microlenses (1010, 1011, 1012, 1013, 1014, 1015) increase with the field and, in most cases, are greater than the original diameter of the microlenses, increasing opaque gaps or interstitial spaces ($g_2$, $g_3$, $g_i$, $g_{i+1}$) between adjacent microlenses are generated. In order to maintain a fill factor close to 1, these interstitial spaces can be filled by increasing the size of the microlenses, as in the example of FIG. 11 showing microlenses (1110, 1111, 1112, 1113, 1114, 1115) with increasing diameters ($D_{i+1} > D_i > D_{i-1} > D_3 > D_2 > D_1$). Optionally, instead of changing the size of the microlenses, a black chrome layer or any opaque paint may be applied on the interstitial spaces between adjacent microlenses to minimize aberrations and imperfections on the edges of the microlenses. This technique of applying an opaque layer can be used even when the sizes of the lenslets are not increased, and even if the fill factor is 1, without interstitial spaces between microlenses. The opaque layers, which are made of a material that do not allow light to go through, not only avoid the possible imperfections of the edges between microlenses (which disappear as far as optical flow of light is concerned), but also take profit of the well know effect that lenses are nearer the paraxial approximation if we restrict the flow of light at their edges and exhibit less aberrations if their edges are avoided with additional apertures (in this case the apertures are produced by the opaque layer).

As the distance between the centre of the microlens i and the microlens i+1 is different to the distance between the centre of the microlens 1, and the microlens i−1, the morphology of each microlens is not necessarily symmetric with respect to its centre.

As an example, but not as a limitation, if square microlenses are used and the fill factor of the microlens array 104 is designed to be equal to one, the shape of the microlenses (especially at the corners of the microlens array 104) is no longer a regular square but a non-regular four-side polygon. The important factor is that the optical centres of the microlenses 106 are designed such that the optical behaviour of real main lenses (as in FIG. 7) with real microlenses (as in FIG. 4) becomes the same as if we had used a paraxial main lens and paraxial lenslets.

An embodiment of the invention for square-shape microlenses is now described, not to limit the generality of the invention but to make it easier to understand; however, it is evident for an expert in the field how to design an embodiment of the present invention with hexagonal, circular or any other shape microlenses. For H fields up to 0.3 (example taken from FIG. 7, which would correspond to central zone 501 and approaching middle lower zone 502 in FIG. 5A) all the square microlenses are completely the same; however, as we gradually approach towards H=1 (approaching extreme lower zone 503 and corner zone 504 in FIG. 5A) the change of the microlenses is as follows:

a. As we approach extreme lower zone 503, the optical centres of adjacent microlenses are not anymore equidistant (the pitch between centres of microlenses is gradually increased), and in an embodiment the square microlenses do not have an exact square shape anymore, they may become square-like polygons in which the side nearer the centre of the microlens array panel is slightly shorter than the side further away of the centre of the microlens array panel, and wherein the other two sides are not parallel anymore but they diverge to link the other two sides that do not have the same length. Note that the key factor to have microimages that resemble the paraxial behaviour (of main lens and lenslets) is not the particular shape of the lenslets but the optical centre of every lenslet (lenslets in which optical centres are not anymore spaced at the same distance).

b. If instead of looking to the lenslet as we move vertically from central zone 501 to extreme lower zone 503 in FIG. 5A, we look to the lenslets as we move horizontally from central zone 501 towards the right or towards the left, the sides of the microlenses parallel to the vertical lines in FIG. 5A increase gradually their lengths if the design is conceived to have 100% fill-factor, as we increase pitches of optical centres to match the requirements from the graph in FIG. 7. As previously explained, length of horizontal lines as we move vertically over the sensor is increased, and now we increase length of vertical lines as we move horizontally from the centre of the sensor. However, the key factor is that the optical centres of lenslets are designed to minimize the non-ideal behaviour of FIGS. 7 and 4).

c. It is also worth noting that in this particular embodiment, with the aim to have 100% fill-factor, the length of the two vertical sides of square microlenses when moving from central zone 501 to extreme lower zone 503 in FIG. 5A is also increasing with the field. And the length of the two horizontal sides of microlenses when moving from central zone 501 horizontally towards the edges of the microlens array panel for H=>0.3 also increases (as 30% of FOV, or field 0.3, is where curves 700 and 710 in FIG. 7 start to diverge).

d. If in the embodiment we are describing we look at the microlenses starting from the central microlens and moving diagonally, it is evident that for a new microlens in fields beyond 0.3 starting at the point of the previous microlens where its two sides meet, if we wish to have 100% fill-factor its two sides starting at said point are slightly shorter than the two parallel sides that start at the opposite point at the other side of the polygon, the point where it meet with the next microlens, so the squares as we move from H=0.3 to H=1 along the 45 degrees direction starting at the central microlens become irregular rhombuses but symmetric around their diagonal or their centres (rhombuses which sides closer to the centre of the microlens array panel are slightly shorter than the sides further away from the microlens array centre).

e. For microlenses not moving along pure horizontal and vertical directions beyond H=0.3, the design of their shapes in this particular embodiment (asymmetric irregular rhombuses) is also straightforward based on previous paragraphs. It is now herein exemplified how the extreme microlens at the bottom left of corner zone 504 in FIG. 5A are designed: the relevant factor is to fix the optical centre of this latest lenslet to match the requirements of FIG. 7 imposed by the upper barrel of lenses. Of the four sides of the rhombus (within this particular rectangular form-factor of the embodiment shown in FIGS. 5A-D) the shortest side of the irregular rhombus would be the inner vertical side 541 at the inner side of the microlens array panel, the second in length would be the outer vertical side 542 at the outer side of the microlens array panel, the third in length would be the inner horizontal side 543 at the inside of the microlens array panel, and the longest side of the irregular rhombus would be the outer horizontal side 544 facing outwards from the microlens array centre.

f. As a result, the grey rectangle in FIG. 5A becomes a pincushion which narrowest dimension is between the extreme horizontal central point 550 at the left of central zone 501 (left extreme of central horizontal line 560 passing along the centre of central zone 501) and the extreme horizontal central point 552 at the right of central zone 501 (right extreme of central horizontal line 560 in FIG. 5A). The longest dimension would be the diagonal between the bottom-left of corner zone 504 and its symmetrical (with respect to the centre of the microlens array panel) at the top right. It is also obvious that the "vertical lines" (actually pincushion-edge lines) between the top and the bottom of the microlens array panel at the extreme right or left side of the panel (outer vertical lines 564 and 566), are also longer than the central vertical line 562 along the centre of the microlens array 104 panel, crossing vertically central zone 501, middle lower zone 502, an extreme lower zone 503 to reach the top and the bottom of the microlens array panel. Such a pincushion shape is not apparent to a human observer (that will perceive a rectangle 104 of microlenses, in grey in FIG. 5A) but a microscopic analysis will unveil its pincushion shape.

When using circular microlenses instead of square microlenses, it is straightforward to design ellipses as we move in the horizontal and vertical directions and asymmetrical ellipses for the rest of the lenslets. The description for hexagonal, triangular or any other microlens array shape, even if slightly more complex to explain, is straightforward of an expert in the field.

Another possible embodiment is to reduce the fill factor of the microlens array. In such scenario, the morphology of every one of the microlenses can be kept symmetric.

The two main aspects of the present invention just described can be summarized as follows:

To minimize the effect of aberrations of the microlenses 106 in the microlens array 104, the microlenses 106 are designed tilted with different degrees of tilting depending on the field (commonly increasing tilts)

To minimize the non-linearity between the CRA and the field H in actual mini-camera main lenses (as CRA curve 700 in FIG. 7), the pitches $P_{ul}$ of the optical centres of the microlenses 106 are increased as they are closer to the edges of the microlens array 104 panel.

These two synergetic aspects may be implemented independently or together in the same microlens array 104, the benefits and synergies to use them together are evident for the design of very small minicameras, as the small length (TTL, Total Track Length) of the lens system oblige to very large CRAs towards the edge of the sensor (towards the edge of the microlens array panel) and the extensive use of aspheric lens elements to avoid aberrations leads to very non-linear curves as in curve 700 of FIG. 7. When combined, the problems of aberrations and non-paraxiality of microlenses can be fixed at the same time, improving drastically the performance of the optical system, that otherwise would deteriorate drastically its performance. If the microlenses are tilted conveniently, the angle of incidence of the rays on the microlenses surface is reduced, reducing the aberrations; likewise, if the pitches are changed conveniently, the centres of the microimages will be located as in a paraxial system (the microlenses are adapted to the main lens CRA).

A further synergetic effect is also achieved when using both approaches together, since not only the optical performance of the camera is improved, but also the computational cost when reconstructing the 4-D light field is greatly reduced (the computations to produce a "non-aberrated" and "paraxial" light field, which are dependent on tolerances of particular cameras and require calibration on a per camera basis, can be completely avoided when using both approaches together).

The microlens array may be designed with variable tilt, with variable pitch, or with a combination of both depending on the specific requirements of the particular embodiment. When combining both, variable pitch and variable tilt, the design and performance analysis to obtain the exact tilting degrees and pitch values must be performed together, as the tilted microlenses may affect the variable pitch design and vice versa.

For obvious reasons, i) the degree of tilting for the microlenses as field increases (until the zone of saturation 704 is reached and beyond), ii) the particular CRA curves of the microlenses surfaces, which not only depend on the physical parameters of the microlens itself but also on the direction of arrival of light from the main lens, and iii) the pace to increase pitches (and optionally sizes) of microlenses as field increases; are all closely related to the deviations of the main lens of the camera from the paraxial behaviour, and more specifically to the CRA non-linear behaviour (as exemplified in FIG. 7) and to other aberrations of the main lens. Hence, lenslet tilting, lenslet surface equations, pitch and size of lenslets as the field increases are closely related to the specific design of any particular main lens and it will be evident for an expert optical designer how to trade-off and design all those factors as related to any particular embodiment of the main lens.

The invention claimed is:

1. A light field acquisition device comprising an optical system, the optical system comprising a main lens, an image sensor and a microlens array comprising a plurality of microlenses, wherein the centres of the microlenses of the microlens array are displaced a certain distance ($d_{ul(i)}$) from a regular arrangement with a constant pitch $P_{ul}$ to an increased new pitch $P_{ul(i)}$ for microlens i, wherein the new pitches $P_{ul(i)}$ compensate the non-linearities of the chief ray angle with the image height, wherein a size of the plurality of microlenses of the microlens array is dependent upon the distance to the center of the microlens array.

2. The light field acquisition device of claim 1, wherein the increased new pitch $P_{ul(i)}$ for microlens i is such that the microimages generated by the microlenses are equally spaced over the image sensor and the microimages of consecutive microlenses do not overlap.

3. The light field acquisition device of claim 1, wherein the size of the microlenses increases with the distance to the center of the microlens array.

4. The light field acquisition device of claim 1, wherein the sizes of the microlenses are such that the fill factor of the microlens array is substantially 1.

5. The light field acquisition device of claim 1, wherein the light field acquisition device is a plenoptic camera.

6. A light field acquisition device comprising an optical system, the optical system comprising a main lens, an image sensor and a microlens array comprising a plurality of microlenses, wherein the centres of the microlenses of the microlens array are displaced a certain distance ($d_{ul(i)}$) from a regular arrangement with a constant pitch $P_{ul}$ to an increased new pitch $P_{ul(i)}$ for microlens i, wherein the new pitches $P_{ul(i)}$ compensate the non-linearities of the chief ray angle with the image height, the light field acquisition device further comprising at least one opaque layer covering the edges of adjacent microlenses.

7. The light field acquisition device of claim 6, wherein the opaque layer is applied on the interstitial spaces ($g_i$) between adjacent microlenses.

8. A light field acquisition device comprising an optical system, the optical system comprising a main lens, an image sensor and a microlens array comprising a plurality of microlenses, wherein the centres of the microlenses of the microlens array are displaced a certain distance ($d_{ul(i)}$) from a regular arrangement with a constant pitch $P_{ul}$ to an increased new pitch $P_{ul(i)}$ for microlens i, wherein the new pitches $P_{ul(i)}$ compensate the non-linearities of the chief ray angle with the image height, wherein the plurality of microlenses of the microlens array are tilted a tilting degree ($\alpha$, $\beta$) with respect to the optical axis of the main lens depending on the distance between the microlens and the center of the microlens array.

9. The light field acquisition device of claim 8, wherein at least a component of the tilting degree ($\alpha$, $\beta$) increases with the distance between the microlens and the center of the microlens array, said condition being fulfilled at least in a zone of the microlens array.

10. The light field acquisition device of claim 8, wherein the microlenses are built on a substrate.

11. The light field acquisition device of claim 8, wherein the microlenses are designed with tilting degrees ($\alpha$, $\beta$) that reduce the chief ray angle of the microlenses, wherein the chief ray angle ($CRA_i$) of a microlens i is the angle formed between the optical axis of the microlens i and the ray that crosses the centre of the aperture of the optical system and reaches the centre of the microlens i.

12. The light field acquisition device of claim 11, wherein the microlenses are designed with tilting degrees ($\alpha$, $\beta$) that compensate the non-linearities between the field position and the chief ray angle of the microlenses.

13. The light field acquisition device of claim 11, wherein the tilting degrees ($\alpha$, $\beta$) of the microlenses are such that the chief ray angle of the corresponding microlens is lower than a predetermined threshold.

14. The light field acquisition device of claim 13, wherein the tilting degrees ($\alpha$, $\beta$) of the microlenses are such that the chief ray angle of the corresponding microlens is substantially 0 degrees.

\* \* \* \* \*